(12) United States Patent
Smith et al.

(10) Patent No.: US 9,613,104 B2
(45) Date of Patent: Apr. 4, 2017

(54) SYSTEM AND METHOD FOR BUILDING A POINT-IN-TIME SNAPSHOT OF AN EVENTUALLY-CONSISTENT DATA STORE

(75) Inventors: Charles Smith, San Jose, CA (US); Jeffrey Magnusson, San Jose, CA (US); Siddharth Anand, Santa Clara, CA (US)

(73) Assignee: NETFLIX, Inc., Los Gatos, CA (US)

( * ) Notice: Subject to any disclaimer, the term of this patent is extended or adjusted under 35 U.S.C. 154(b) by 466 days.

(21) Appl. No.: 13/399,467

(22) Filed: Feb. 17, 2012

(65) Prior Publication Data

US 2013/0218840 A1    Aug. 22, 2013

(51) Int. Cl.
| | | |
|---|---|---|
| *G06F 7/00* | (2006.01) | |
| *G06F 17/30* | (2006.01) | |
| *G06F 11/14* | (2006.01) | |
| *G06F 11/16* | (2006.01) | |
| *G06F 11/20* | (2006.01) | |

(52) U.S. Cl.
CPC .... *G06F 17/30548* (2013.01); *G06F 11/1446* (2013.01); *G06F 17/30551* (2013.01); *G06F 11/1662* (2013.01); *G06F 11/2094* (2013.01); *G06F 2201/80* (2013.01); *G06F 2201/82* (2013.01); *G06F 2201/835* (2013.01)

(58) Field of Classification Search
None
See application file for complete search history.

(56) References Cited

U.S. PATENT DOCUMENTS

| | | |
|---|---|---|
| 7,120,572 B1 | 10/2006 | Liang |
| 2003/0115301 A1* | 6/2003 | Koskimies .................... 709/221 |
| 2005/0165867 A1* | 7/2005 | Barton et al. ................. 707/204 |
| 2006/0036676 A1 | 2/2006 | Cardone et al. |
| 2007/0239769 A1 | 10/2007 | Fazal et al. |
| 2008/0059541 A1 | 3/2008 | Fachan et al. |
| 2011/0213756 A1* | 9/2011 | Chen et al. ................... 707/684 |
| 2011/0289052 A1 | 11/2011 | Rambacher et al. |
| 2011/0295815 A1* | 12/2011 | Mandagere et al. .......... 707/690 |

(Continued)

OTHER PUBLICATIONS

PCT International Search Report and Written Opinion dated May 20, 2013, International Patent Application No. PCT/US13/026513.

(Continued)

*Primary Examiner* — Thu Nga Nguyen
(74) *Attorney, Agent, or Firm* — Artegis Law Group, LLP

(57) ABSTRACT

A method and system for building a point-in-time snapshot of an eventually-consistent data store. The data store includes key-value pairs stored on a plurality of storage nodes. In one embodiment, the data store is implemented as an Apache® Cassandra database running in the "cloud." The data store includes a journaling mechanism that stores journals (i.e., inconsistent snapshots) of the data store on each node at various intervals. In Cassandra, these snapshots are sorted string tables that may be copied to a back-up storage location. A cluster of processing nodes may retrieve and resolve the inconsistent snapshots to generate a point-in-time snapshot of the data store corresponding to a lagging consistency point. In addition, the point-in-time snapshot may be updated as any new inconsistent snapshots are generated by the data store such that the lagging consistency point associated with the updated point-in-time snapshot is more recent.

17 Claims, 10 Drawing Sheets

(56) References Cited

U.S. PATENT DOCUMENTS

2012/0150804 A1* 6/2012 Adkins et al. ................ 707/639
2013/0007388 A1* 1/2013 Kito et al. .................... 711/162

OTHER PUBLICATIONS

European Search Report dated Nov. 13, 2015 in Application No. PCT/US2012/026513.
Richard P Spillane et al: "An efficient multi-tier tablet server storage architecture". Cloud Computing. ACM. 2 Penn Plaza. Suite 701 New York NY 10121-0701 USA. Oct. 26, 2011 (Oct. 26, 2011). pp. 1-14. XP058005035. DOI: 10.1145/2038916.2038917 ISBN: 978-1-4503-0976-9.
Thilina Gunarathne et al: "MapReduce in the Clouds for Science". Cloud Computing Technology and Science (Cloudcom). 2010 IEEE Second International Conference on. IEEE. Nov. 30, 2010 (Nov. 30, 2010). pp. 565-572. XP031900302. DOI: 10.1109/CLOUDCOM.2010.107 ISBN: 978-1-4244-9405-7.

\* cited by examiner

| Table 700 | | | | | |
|---|---|---|---|---|---|
| Key 312(i) | Col_1 313(i) | Time 313-1(i) | Col_2 314(i) | Time 314-1(i) | |
| "Bob" | "name" : "Bobby12" | 1325135486 | "pass" : "BBCali24" | 1325135486 | 311(0) |
| "Bob" | "name" : "Bobby12" | 1327529267 | "pass" : "bigboy123" | 1327529267 | 311(1) |
| "Carrie" | "name" : "SweetC" | 1331256458 | "pass" : "Rocket" | 1331256458 | 311(2) |
| "Bob" | "name" : "Bobby12" | 1327529267 | "pass" : "bigboy123" | 1327529267 | 311(3) |
| "Carrie" | "name" : "SweetC" | 1331256458 | "pass" : "Rocket" | 1331256458 | 311(4) |
| "Carrie" | "name" : "SweetC" | 1331256458 | "pass" : "Rocket" | 1331256458 | 311(5) |
| "Jim" | "name" : "Jimbo" | 1328351243 | "pass" : "Kahuna88" | 1328351243 | 311(6) |
| "Bob" | "name" : "Bobby12" | 1327529267 | "pass" : "bigboy123" | 1327529267 | 311(7) |
| "Jim" | "name" : "Jimbo" | 1328351243 | "pass" : "Kahuna88" | 1328351243 | 311(8) |
| "Jim" | "name" : "Jimbo" | 1328351243 | "pass" : "Kahuna88" | 1328351243 | 311(9) |
| "Steve" | "name" : "SteveO" | 1303450683 | "pass" : "BigDog_74" | 1303450683 | 311(10) |
| "Bob" | "name" : "Bobby12" | 1325135486 | "pass" : "BBCali24" | 1325135486 | 311(11) |
| "Steve" | "name" : "SteveO" | 1303450683 | "pass" : "BigDog_74" | 1303450683 | 311(12) |
| "Carrie" | "name" : "Carrie" | 1381346858 | "pass" : "Rocket" | 1381346858 | 311(13) |
| "Carrie" | "name" : "Carrie" | 1381346858 | "pass" : "Rocket" | 1381346858 | 311(14) |
| "Steve" | "name" : "SteveO" | 1303450683 | "pass" : "BigDog_74" | 1303450683 | 311(15) |

Figure 7A

| Table 710 | | | | | |
|---|---|---|---|---|---|
| Key 312(i) | Col_1 313(i) | Time 313-1(i) | Col_2 314(i) | Time 314-1(i) | |
| "Bob" | "name" : "Bobby12" | 1325135486 | "pass" : "BBCali24" | 1325135486 | 311(0) |
| "Bob" | "name" : "Bobby12" | 1325135486 | "pass" : "BBCali24" | 1325135486 | 311(1) |
| "Bob" | "name" : "Bobby12" | 1327529267 | "pass" : "bigboy123" | 1327529267 | 311(2) |
| "Bob" | "name" : "Bobby12" | 1327529267 | "pass" : "bigboy123" | 1327529267 | 311(3) |
| "Bob" | "name" : "Bobby12" | 1327529267 | "pass" : "bigboy123" | 1327529267 | 311(4) |
| "Carrie" | "name" : "SweetC" | 1331256458 | "pass" : "Rocket" | 1331256458 | 311(5) |
| "Carrie" | "name" : "SweetC" | 1331256458 | "pass" : "Rocket" | 1331256458 | 311(6) |
| "Carrie" | "name" : "SweetC" | 1331256458 | "pass" : "Rocket" | 1331256458 | 311(7) |
| "Carrie" | "name" : "Carrie" | 1381346858 | "pass" : "Rocket" | 1381346858 | 311(8) |
| "Carrie" | "name" : "Carrie" | 1381346858 | "pass" : "Rocket" | 1381346858 | 311(9) |
| "Jim" | "name" : "Jimbo" | 1328351243 | "pass" : "Kahuna88" | 1328351243 | 311(10) |
| "Jim" | "name" : "Jimbo" | 1328351243 | "pass" : "Kahuna88" | 1328351243 | 311(11) |
| "Jim" | "name" : "Jimbo" | 1328351243 | "pass" : "Kahuna88" | 1328351243 | 311(12) |
| "Steve" | "name" : "SteveO" | 1303450683 | "pass" : "BigDog_74" | 1303450683 | 311(13) |
| "Steve" | "name" : "SteveO" | 1303450683 | "pass" : "BigDog_74" | 1303450683 | 311(14) |
| "Steve" | "name" : "SteveO" | 1303450683 | "pass" : "BigDog_74" | 1303450683 | 311(15) |

Figure 7B

| Table 720 | | | | | |
|---|---|---|---|---|---|
| Key 312(i) | Col_1 313(i) | Time 313-1(i) | Col_2 314(i) | Time 314-1(i) | |
| "Bob" | "name" : "Bobby12" | 1327529267 | "pass" : "bigboy123" | 1327529267 | 311(0) |
| "Carrie" | "name" : "Carrie" | 1381346858 | "pass" : "Rocket" | 1381346858 | 311(1) |
| "Jim" | "name" : "Jimbo" | 1328351243 | "pass" : "Kahuna88" | 1328351243 | 311(2) |
| "Steve" | "name" : "SteveO" | 1303450683 | "pass" : "BigDog_74" | 1303450683 | 311(3) |

Figure 7C

SYSTEM AND METHOD FOR BUILDING A POINT-IN-TIME SNAPSHOT OF AN EVENTUALLY-CONSISTENT DATA STORE

BACKGROUND OF THE INVENTION

Field of the Invention

Embodiments of the invention generally relate to eventually-consistent data stores. More specifically, embodiments of the invention relate to systems and methods for building a point-in-time snapshot of an eventually-consistent data store.

Description of the Related Art

Companies involved in e-commerce typically maintain one or more datacenters to provide the resources to handle customer's needs on the Internet. A datacenter may consist of hundreds or thousands of server computers in a single building along with high-speed communication lines to connect those servers to the Internet. The servers may also be connected to large data stores that consist of thousands of disk drives or other non-volatile storage.

Lately, a "cloud" computing model has enabled companies to purchase computing resources on an as-needed basis from providers such as Amazon®. Cloud computing is the delivery of computing resources as a service over a network such as the Internet. Instead of the company maintaining the datacenter at a facility owned by the company, the company can "lease" use of a virtual data center provided by a third-party provider. The provider maintains the hardware at various locations throughout the world, which the company can lease and scale to match the companies needs at any given time.

One aspect of cloud services is cloud storage, where the provider leases virtual storage space to various companies or individuals. For example, Amazon® Web Services (AWS) include Amazon® Simple Storage Service (S3) that enables a user to store objects (e.g., videos, documents, etc.) at datacenters around the world using a web interface. The user can choose in which geographic region an object is stored and choose an amount of redundancy (i.e., by storing the object at multiple different datacenters) that ensures object availability even if one datacenter goes offline.

An eventually-consistent data store is a data store that sacrifices consistency for availability and partition tolerance. In other words, a system may store data redundantly in multiple locations in order to ensure that the data is available despite communication failure between nodes (partition tolerance), however, the system cannot then also ensure that the data is consistent across the multiple nodes. Eventually-consistent data stores ensure that requests for data are serviced quickly while not ensuring that the data is consistent across every node where that data may be stored.

In order to retrieve a consistent snapshot of data from the distributed data store, an administrator must either force a consistent read across all nodes (essentially preventing any requests from being processed by the system during this time) or read separately from the various nodes and reconcile the data at a later time. The former poses a large load on the data store and, in some cases, may be impossible to perform given the distributed nature of the data store. The latter requires additional services to be implemented in the data store to generate a snapshot of the state of each individual node and the ability to reconcile the data from every node at a later point in time.

Improved techniques are needed to provide data analysts with a snapshot of the eventually-consistent data store at a particular point-in-time that does not interfere with normal operation of the data store.

SUMMARY OF THE INVENTION

One embodiment of the present invention includes a method for building a point-in-time snapshot of an eventually-consistent data store distributed among a plurality of nodes connected by a network. The method includes the steps of receiving a plurality of inconsistent snapshots, wherein each inconsistent snapshot includes one or more rows of key-value pairs associated with the data store and reflects the contents of at least a portion of the data store stored on a particular node of the plurality of nodes, and generating the point-in-time snapshot by resolving the rows of key-value pairs to remove any inconsistent values, wherein the point-in-time snapshot includes a subset of the key-value pairs included in the plurality of inconsistent snapshots.

Other embodiments include, without limitation, a computer-readable medium that includes instructions that enable a processing unit to implement one or more aspects of the disclosed methods as well as a system configured to implement one or more aspects of the disclosed methods.

One advantage of such techniques is that a consistent snapshot of the data store may be generated using back-up copies of a set of inconsistent snapshots automatically generated by each node of the data store. Each back-up copy may be resolved to produce a consistent snapshot of a single node, which in the aggregate may be resolved to produce a consistent snapshot of the entire data store. Resolving the back-up copies of the inconsistent snapshots may be performed on a related system to generate a point-in-time snapshot without overloading the data store during normal operation. Thus, users of the data store are free to access the data store uninterrupted while data analysts may perform analysis of various metrics using a consistent view of the data store at a point-in-time in the recent past (such as generated once a day).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A, 7B, and 7C illustrate various intermediate data structures generated by a cluster to create a point-in-time snapshot of the data store, according to one example embodiment of the invention;

DETAILED DESCRIPTION

Embodiments of the invention provide techniques for building a point-in-time snapshot of an eventually-consistent data store. One or more compute nodes collect a plurality of node specific snapshots generated by a plurality of distributed nodes that implements the eventually-consistent data store. Each of the node specific snapshots is created at various times in relation to the overall data store such that the individual snapshots may contain inconsistent data. Then, one or more compute nodes analyze the plurality of snapshots to generate a consistent snapshot of the entire data store corresponding to a previous point-in-time. The lagging consistency point of the snapshot may be updated based on additional snapshots generated by the plurality of distributed nodes at various intervals.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
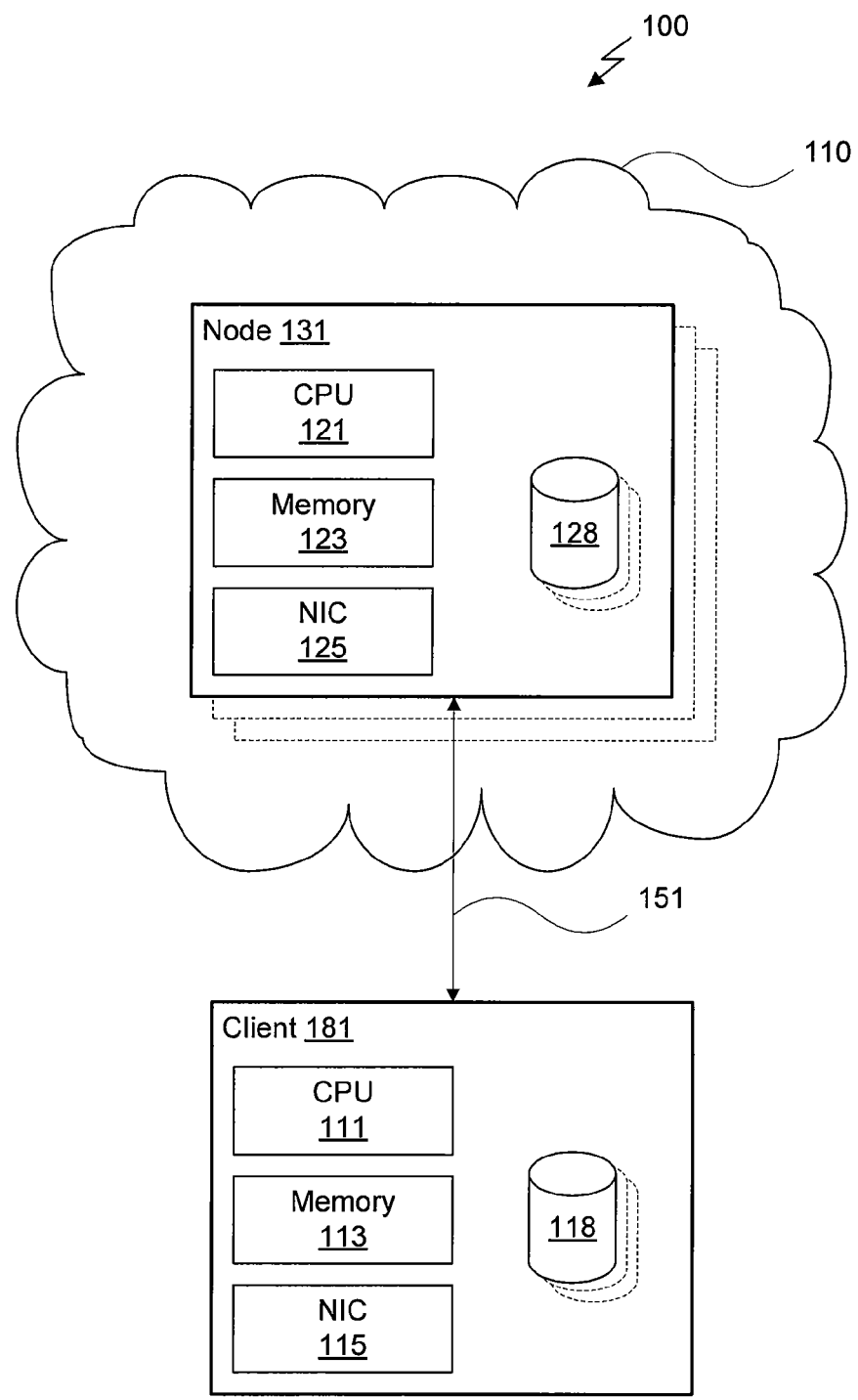
FIG. 1 illustrates a distributed computer network, according to one example embodiment of the invention.

FIG. 1 illustrates a distributed computer network 100, according to one example embodiment of the invention. As shown, the distributed computer network 100 includes a client computer 181 connected to a cloud computing infrastructure 110 (i.e., "the cloud") that includes a plurality of compute nodes 131. The client computer 181 may be connected to the cloud 110 via a network 151 such as a LAN (Local Area Network), a WAN (Wide Area Network), or the Internet. The cloud 110 provides one or more virtual computing services via standard messaging protocols (e.g., SOAP, REST, etc.) over the network 151. Examples of virtual computing services may include processing capacity, storage, and relational databases, among many other types of services. In one embodiment, the cloud 110 is hosted by a cloud services provider such as Amazon®. The cloud services provider houses the nodes 131 in various datacenters in different physical locations around the world and enables clients to access the cloud services over the network 151. For example, Amazon® hosts a virtual cloud storage solution called Amazon Simple Storage Service™ (S3) as well as a virtual processing solution called Amazon Elastic Compute Cloud™ (EC2), accessible through the internet using common transport protocols such as Hypertext Transport Protocol (http). In another embodiment, a single organization may host both the cloud 110 and the client computer 181 in a private network.

Each of the nodes 131 includes a processor (CPU) 121, a memory 123, a network interface controller (NIC) 125, and one or more non-volatile storage devices 128 such as a hard-disk drive, a magnetic tape drive, optical disk drives, a drive array (e.g., RAID), or the like. Each node 131 may include an operating system (e.g., Microsoft® Windows™, Linux™, Unix®, etc.) as well as one or more applications stored in memory 123 and running on CPU 121. Some of the applications may provide a software framework for various cloud service architectures, such as a distributed database management system like Apache™ Casandra or distributed application system like Apache™ Hadoop. In one embodiment, each node 131 comprises a blade server, where two or more blade servers are housed in a chassis and share certain resources such as common power supplies and cooling systems.

Client computer 181 also includes a processor (CPU) 111, a memory 113, a NIC 115, and one or more non-volatile storage devices 118. Similar to nodes 131, client computer 181 also includes an operating system as well as one or more applications stored in memory 113 and running on CPU 111. In one embodiment, client computer 181 may be maintained by a data analyst to analyze the distributed computer network 100. Client computer 181 may communicate with each of the nodes 131 via network 151 (through NIC 115 and NICs 125).

Figure 2:
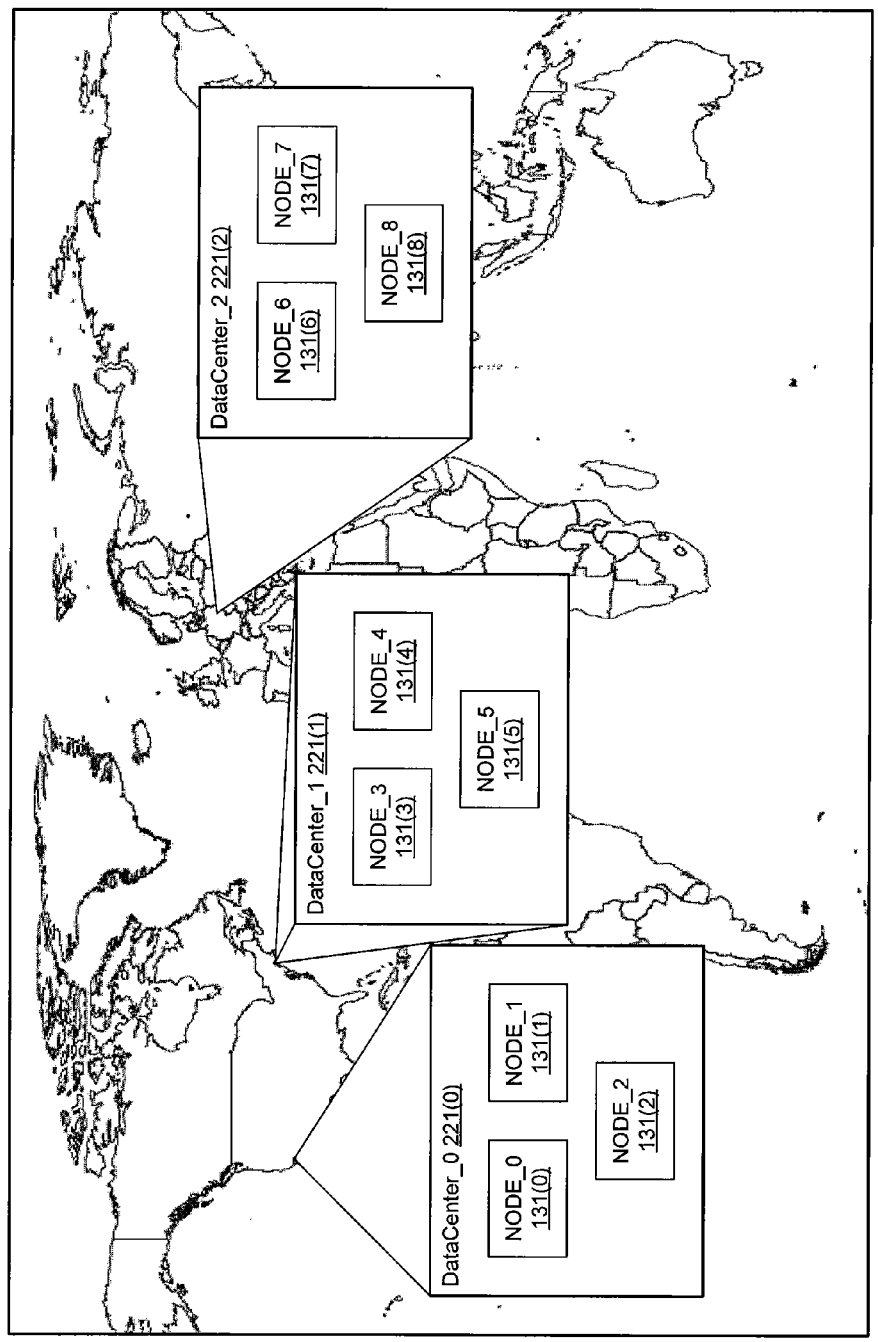
FIG. 2 illustrates the global nature of the distributed computer network, according to one example embodiment of the invention.

FIG. 2 illustrates the global nature of the distributed computer network 100, according to one example embodiment of the invention. A cloud services provider may build and maintain datacenters 221 at various locations around the world. As shown in FIG. 2, a first data center (DataCenter_0) 221(0) may be located in a western region of North America, a second data center (DataCenter_1) 221(1) may be located in an eastern region of North America, and a third data center (DataCenter_2) 221(2) may be located in a European region. The distributed nature of the various nodes 131 may decrease latency for servicing requests transmitted to the cloud service from different areas of the world. For example, a request generated in France may be serviced by a node in DataCenter_2 221(2) whereas a request generated in California may be serviced by a node in DataCenter_0 221(0). The latency for receiving a response based on these requests is reduced compared to a network in which every request is serviced by a particular node at a particular location.

In one embodiment, each data center 221 includes three nodes 131. The first data center 221(0) includes a first node (Node_0) 131(0), a second node (Node_1) 131(1), and a third node (Node_2) 131(2). The second data center 221(1) includes a fourth node (Node_3) 131(3), a fifth node (Node_4) 131(4), and a sixth node (Node_5) 131(5). The third data center 221(2) includes a seventh node (Node_6) 131(6), an eighth node (Node_7) 131(7), and a ninth node (Node_8) 131(8). A group of nodes may be referred to as a cluster. For example, a multi-data center deployment of a cluster that implements the eventually-consistent data store may include all nine nodes (131(0), 131(1), . . . , 131(8)) shown in FIG. 2. In other embodiments, each cluster may be comprised of three or more nodes.

It will be appreciated that the nodes of FIGS. 1 and 2 in the cloud 110 may represent physically distinct computing resources, such as individual blade servers, or virtual computing resources such as distinct virtual machines that may share access to a pool of physical computing resources. The effect is the same, as some physical computing resources are being used to store the data in multiple physical hardware devices, likely at locations in separate data centers throughout the world.

Figure 3:
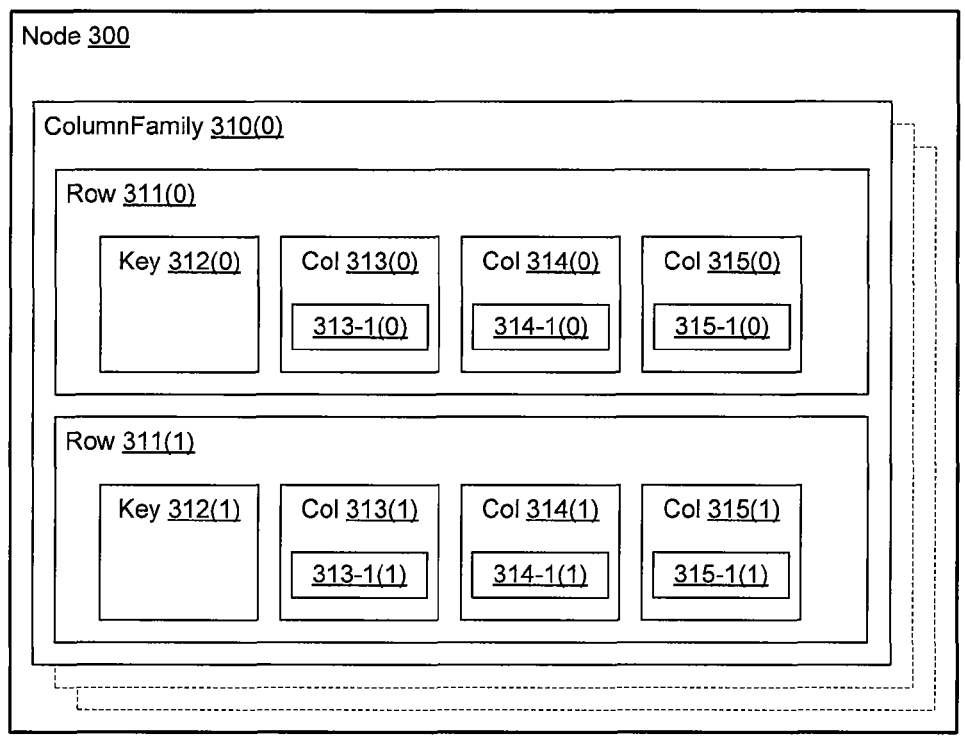
FIG. 3 illustrates one node of an eventually-consistent data store, according to one example embodiment of the invention.

FIG. 3 illustrates one node 300 of an eventually-consistent data store, according to one example embodiment of the invention. Relational databases typically store data in a series of related tables, each table having a defined structure in relation to other tables. Because of how the data is structured, operations to query or write to the relational database are expensive. The database server is required to do additional work to ensure data integrity among the many related tables. In contrast, key-value data stores often offer high availability or scalability at the cost of consistency and the ability to support complex queries. Key-value data stores are better in this manner because they support operations that perform better when distributed among many individual nodes. Key-value data stores are simpler to implement than a relational database, but may be harder to query because the relationships between values must be stored explicitly. Rather than associating a user with each entry in a related table, thus binding all entries related to the same user across multiple tables, each entry in the key-value data store explicitly includes an identifier that specifies a relationship.

Node 300 implements a persistent distributed multi-dimensional map (i.e., an associative array). In other words, node 300 implements a structured key-value data store in which each key may map to one or more values. In one embodiment, the data store is implemented in the cloud 110 via the Apache™ Cassandra application framework. In Cassandra, multiple values are grouped into tables known as "column families". A column family is a container mapping row keys to a sorted list of key/value pairs (i.e., "columns"). As shown in FIG. 3, node 300 includes one or more column families 310 defined when a Cassandra database is implemented. As key-value pairs are added to the data store, a row 311 will be added to the column family 310. Each row includes exactly one key 312 and one or more columns (e.g., 313, 314, 315, etc.). Key 312 is a universally unique identifier (UUID) that associates that key 312 to the values stored for each column. For example, the UUID may be a 128-bit value that is generated whenever a new row 311 is added to the data store. In other embodiments, the key 312 may be a string identifier. Each column family 310 may be associated with a Column Family Identifier. The identifier may be a string such as "Users", for example.

Columns (e.g., 313, 314, 315, etc.) within each column family 310 are associated with an identifier (e.g., a string) and a timestamp (e.g., 313-1, 314-1, 315-1, etc.). Each row 311 in a column family 310 may define a number of different columns that represent various values associated with a particular key 312. For example, in a "Users" column family 310(0), column 313(0) may be associated with a "username" identifier, column 314(0) may be associated with a "password" identifier, and column 315(0) may be associated with an "address" identifier. In some embodiments, each row 311 may include a different set of columns. In other words, each row 311 may include a subset of all columns associated with the column family 310. In such embodiments, column 313(0) may be associated with a "username" identifier, while column 313(1) may be associated with a different identifier such as a "password" identifier.

Data may be added to the data store by various applications running on client computer 181 or the like (such as a mobile phone or tablet computer). For example, a user may enter information on a web page and click a submit button. The web page may include a form with text boxes for entering a username, password, and an address. When the user clicks submit, a standard RESTful request message is generated and transmitted to an URL associated with the cloud 110 via network 151. The message will typically be proxied by a web server and application server to one of the nodes 131, which causes an entry (i.e., row 311) to be added to the data store. The node 131 may generate a UUID associated with the request and create a row 311(0) in the data store to hold the strings entered on the web page. Key 312(0) may hold the UUID, column 313(0) may include the string entered on the web page in the username textbox, column 314(0) may include the string entered on the web page in the password textbox, and column 315(0) may include the string entered on the web page in the address textbox. As additional users submit information via the web page, additional RESTful request messages are sent to the cloud 110 and more rows are added to data store.

In one embodiment, data store is persistent, meaning that once a value for a particular key 312 is added to data store, the value will never be deleted from the data store. In such instances, in order to update a value associated with a particular key 312, a new row may be added to data store using the same key 312. Each column may also include a timestamp (e.g., 313-1, 314-1, 315-1) that indicates a particular time at which the corresponding column data (e.g., 313, 314, 315) was added to data store. When two rows share the same key 312, columns associated with the same identifier may be inconsistent. In such cases, the column associated with the most recent timestamp will hold the most recent value, and all other columns associated with that identifier may be discarded for that particular key 312.

Figure 4:
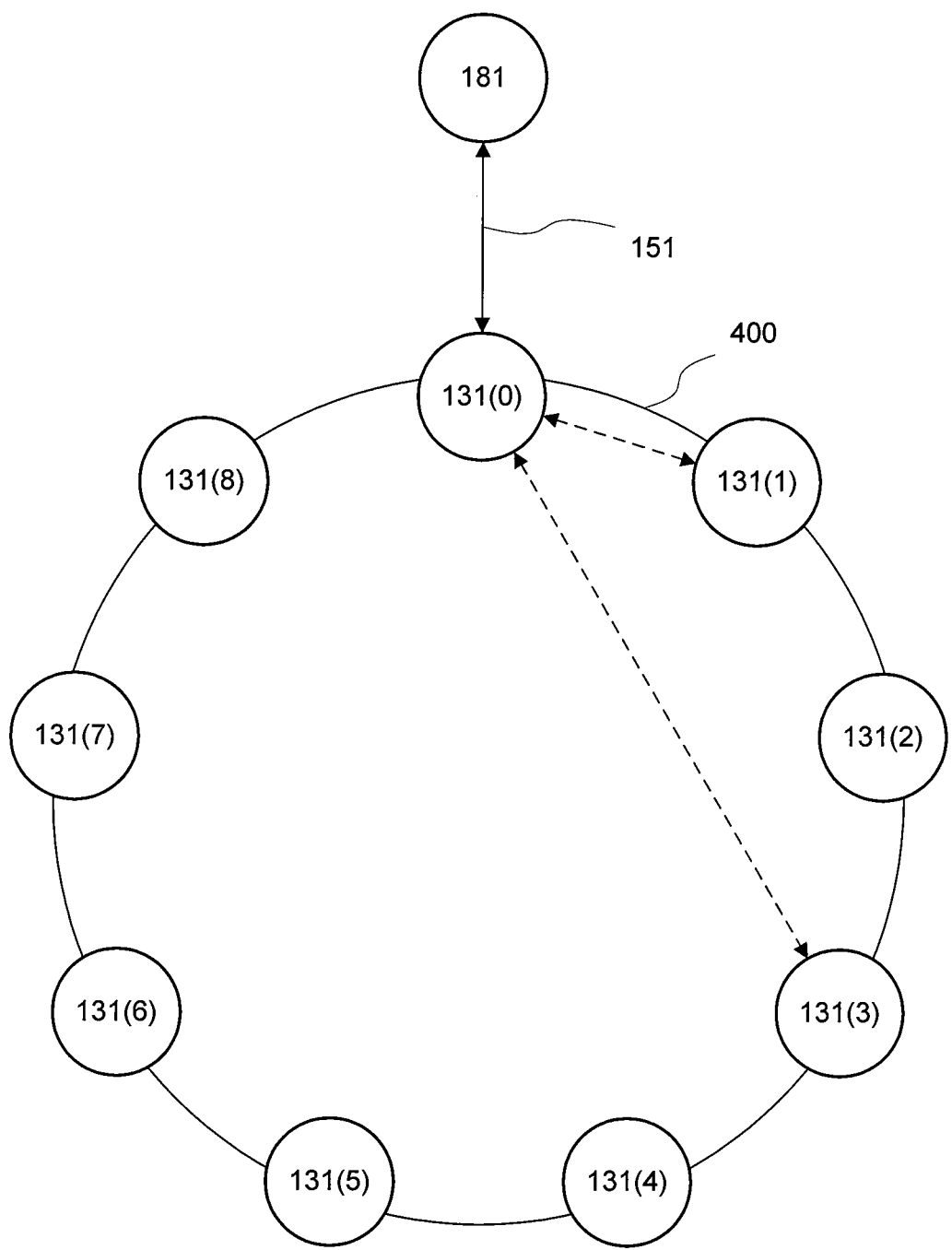
FIG. 4 illustrates a cluster configured to implement the eventually-consistent data store of FIG. 3, according to one example embodiment of the invention.

FIG. 4 illustrates a cluster 400 configured to implement the eventually-consistent data store of FIG. 3, according to one example embodiment of the invention. As shown in FIG. 4, cluster 400 includes 9 nodes 131 located in 3 distinct data centers, which may be visualized as a ring. Again, Node_0 131(0), Node_1 131(1), and Node_2 131(2) are located in a first data center, Node_3 131(3), Node_4 131(4), and Node_5 131(5) are located in a second data center, and Node_6 131(6), Node_7 131(7), and Node_8 131(8) are located in a third data center. Each of the nodes 131 is configured to implement the same framework such that requests from any client computer 181 may be processed by any of the nodes 131 of cluster 400. It will be appreciated that a cluster may include any number of nodes located in one or more data centers.

Client computer 181 connects to one of the nodes of cluster 400, such as Node_0 131(0) via network 151. The node to which client computer 181 connects acts as a coordinator for requests transmitted by client computer 181 to read from or write to the data store. Each request is associated with a particular key 312 and a particular column family 310. The "coordinator" node will analyze the key 312 to determine which node of the cluster is configured to store that particular value, a process known as partitioning. For example, keys 312 may be hashed to generate an MD5 hash value, that randomly assigns a particular key 312 to one of the nodes 131 of the cluster 400. Cluster 400 may also be associated with a replication factor that ensures that data is stored redundantly such that a failure in one node does not stop requests to access the data store from being serviced by the cluster 400. For example, a replication factor of 3 reflects that data is stored on three nodes.

In one embodiment, data will be stored on a primary node associated with a particular key, a secondary node located on the same rack in the data center as the primary node, and a tertiary node located in a different data center from the primary node. As shown in FIG. 4, a request received by Node_0 to store a value associated with a key 312 that corresponds to Node_0 will cause a row to be added to a column family 310 in Node_0 131(0), a row to be added to a column family 310 in Node_1 131(1), and a row to be added to a column family 310 in Node_3 131(3). Similarly, if a different node received a request related to the same key 312 value, then that node would forward the request to Node_0, Node_1, and Node_3.

Figure 5:
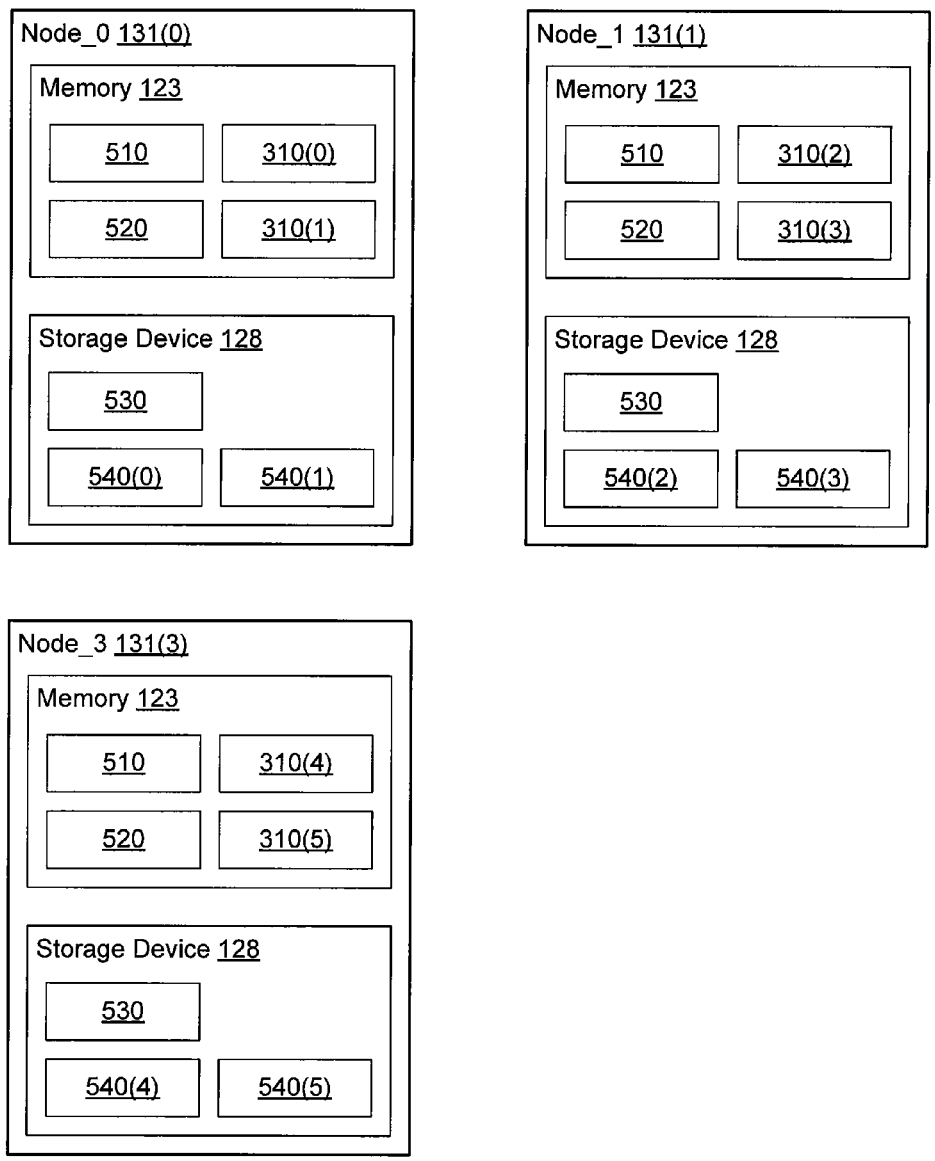
FIG. 5 illustrates one implementation of an eventually-consistent data store on the cluster of FIG. 4, according to one example embodiment of the invention.

FIG. 5 illustrates one implementation of an eventually-consistent data store, according to one example embodiment of the invention. The data store is implemented using various data structures stored on a plurality of nodes in cluster 400. Referring back to FIG. 4, data associated with a particular key that corresponds to Node_0 is replicated on a number of nodes specified by a replication factor for a cluster (e.g., for a replication factor of 3, data is replicated on Node_0 131(0), Node_1 131(1), and Node_3 131(3)). The nodes in the cluster 400 are peers where any node is configured to service a request from a client computer 181. Returning to FIG. 5, each node 131 includes an operating system 510 and an application 520 in memory 123. In one embodiment, application 520 implements the Apache™ Cassandra framework that handles requests to access the data store and transmits/receives messages to/from other nodes in the cluster 400 as well as any client computer 181 connected to that node.

As data is requested to be added to or retrieved from the data store via one or more client computers 181 attached to the cloud 110, a message is routed to one of the nodes 131 in the cluster 400. The message may contain a request to write to the data store or read from the data store. For a WRITE request, the message may define a number of nodes within the cluster to which the value should be written in order to consider the WRITE successful. A WRITE request may be considered successful when a response is received from a single node within the cluster, a quorum of nodes within the cluster, or all nodes within the cluster associated with the key specified by the write request. For example, based on a cluster 400 associated with a replication factor of 3, writing to a single node requires a response from one of the three nodes associated with a key, writing to a quorum of nodes requires a response from two of the three nodes associated with the key, and writing to all the nodes requires a response from three of the three nodes associated with the key. It will be appreciated that a quorum WRITE request does not reflect that data is written to a quorum of all nodes within the cluster but merely that data is written to a quorum of the nodes associated with storing that particular key. Similarly, a READ request may read a value from a single node within the cluster, a quorum of nodes within the cluster, or all nodes within the cluster.

Writing to a single node is a fast operation, but fails to ensure that a READ request will return the correct data (e.g., the READ request may be directed to a different node than the node where the data was written). Writing to all the nodes is a slow operation, but ensures that a READ request to a single node will always return the correct data. Writing to a quorum of nodes is a faster operation than writing to all the nodes while also ensuring that, in conjunction with issuing a quorum READ request, the correct data is always returned to a user, even though a READ is only performed on a subset of the nodes associated with that key. Reading a value from a single node is a fast operation, but does not ensure that the returned value is correct (i.e., the correct value may be stored in a different node). Reading a value from a quorum of nodes is a slower operation than reading from a single node, but reading from a quorum of nodes will ensure that the correct value is returned as long as the value was also written to a quorum of nodes. When reading from a quorum of nodes, the READ request is forwarded to a quorum of the nodes associated with the given key and the correct value is given by the value that was returned with the highest frequency. In the event of a tie (e.g., two queried nodes, out of the three nodes associated with the key, return different values), the value associated with the most recent timestamp (313-1, 314-1, etc.) is selected as the correct value. Reading a value from all nodes is a slower operation, but will always ensure that the correct value is returned, regardless of whether the value was written to one node, a quorum of nodes, or all nodes within the cluster 400.

Application 520 is configured to store key-value pairs in the data store and perform backend operations to ensure that the data store is eventually-consistent across every node. As a request is received by a node, the request is added to a commit log 530, stored in storage device 128. The commit log 530 acts like a buffer that allows requests to be processed asynchronously from when the requests arrive at the node. The commit log 530 is stored in storage device 128 so that, in the event of a power failure, requests may be processed by replaying the requests stored in the commit log 530, ensuring integrity of the data in the data store. In other embodiments, requests may be processed as they are received by a node 131, thereby obviating the need for commit log 530. However, in such other embodiments, a power failure may result in requests not being processed by a node and data being lost within the data store. These embodiments improve on latency caused by a disk input/output operation, but sacrifice robustness because pending requests may be lost due to power failure of a single node.

As each node 131 receives a WRITE request, application 520 adds a new row 311 to the appropriate column family 310 specified in the WRITE request. Again, the row 311 includes a key 312 along with values corresponding to one or more columns (e.g., 313, 314, 315, etc.). As shown in FIG. 5, Node_0 131(0) includes two column families 310(0) and 310(1). For example, the first column family 310(0) may correspond to a database of distinct users, and a second column family 310(1) may correspond to data associated with various users specified in the rows of the first column family 310(0). As Node_0 131(0) receives WRITE requests that specify the first column family 310(0), application 520 stores the WRITE requests to the commit log 530. Application 520 also processes requests from the commit log 530 as the processing capacity of CPU 121 allows. When a WRITE request is retrieved from commit log 530, application 520 adds a row 311 to the column family 310 specified by the WRITE request and, if necessary, transmits a message to the originating node in cluster 400 indicating that the operation was successful (where the node did not receive a request directly from a client computer 181 but rather a request that was forwarded from another node in cluster 400 to which the client computer 181 has established a direct communications channel with cluster 400).

As also shown in FIG. 5, Node_1 131(1) includes two column families, a first column family 310(2) that corresponds to the first column family 310(0) in Node_0 131(0) and a second column family 310(3) that corresponds to the second column family 310(1) in Node_0 131(0). For example, the first column family 310(2) in Node_1 131(1) may contain one or more rows associated with various users. Some of the rows in the first column family 310(0) in Node_0 131(0) may also be stored in the first column family 310(2) in Node_1 131(1). Other rows may only be found in either Node_0 131(0) or Node_1 131(1) due to the eventually-consistent nature of the data store. For example, a WRITE request may only specify that data be written to a single node and, therefore, the data may be added to column family 310(0) but not column family 310(2). Similar to Node_0 131(0) and Node_1 131(1), Node_3 131(3) includes two column families 310(4) and 310(5), the first column family 310(4) corresponds to the first column family 310(0) of Node_0 131(0) and the first column family of Node_1 131(1) and the second column family 310(5) corresponds to the second column family 310(1) of Node_0 131(0) and the second column family 310(3) of Node_1 131(1).

Column families 310 may become very large. In addition, each node 131 may contain a plurality of column families 310. Thus, memory capacity for each node may be insufficient to store all of the data. Although not shown explicitly, nodes 131 may implement a backing store in storage device 128 to hold portions of column families 310. As a column family 310 grows past a threshold value, some of the rows of column family 310 may be copied into the storage device 128 and removed from memory 123. When servicing READ requests, node 131 may check the portions of the column family 310 in memory 123 as well as portions of the column family 310 in storage device 128, portions of which may be temporarily read into memory 123 to service the READ request.

As the coordinator node transmits WRITE requests to various nodes associated with a particular key 312, some nodes may not be able to perform the WRITE operation. For example, a particular node may be disconnected from the cloud 110 due to a power failure at the data center or a failure in the communications link between nodes. In this case, the WRITE will fail and data for a given key will be inconsistent between the various nodes of the cluster 400. In addition, a client computer 181 may request a WRITE operation to only a single node in order to reduce latency, sacrificing consistency in the process. In such cases, application 520 may be configured to periodically repair the data store to ensure that replicas are consistent between nodes. This operation may be performed in the background, by checking that a value associated with a key in a column family is the same as the value stored in a column family on a different node associated with that key. If the values are different, then the application 520 will transmit a WRITE request to the node that stores the incorrect data in order to make the nodes consistent across the cluster. Again, this operation may be performed in the background to avoid high latencies to be experienced by client computers attempting to access the data store. In other words, over time, an entry added to a column family 310 in one node will eventually be replicated across a number of redundant nodes, even if the data was only written to one node based on the request.

As WRITE requests are processed by the nodes of the cluster, the size of each column family 310 increases. Application 520 is configured to periodically flush the entries in column families 310 to a non-volatile storage device 128 in a data structure known as an SSTable ("sorted string table") 540. The SSTable 540 data structure is a persistent data structure of key-value pairs that may be associated with a bloom filter. A bloom filter enables application 520 to quickly check whether a particular key 312 is likely included within the SSTable 540 (a bloom filter will sometimes return a false positive that a key is included in the table, but will never return a negative response when the key is included in the table). SSTables 540 are immutable, meaning that once the SSTables 540 are written to storage device 128, those SSTables 540 are never modified, but rather, additional SSTables 540 are written to storage device 128. As shown in FIG. 5, Node_0 131(0) includes two SSTables 540, a first SSTable 540(0) that corresponds to the first column family 310(0) in Node_0 131(0) and a second SSTable 540(1) that corresponds to the second column family 310(1) in Node_0 131(0). Again, application 520 is configured to periodically flush column families 310 to non-volatile storage 128 in order to permanently store key-value pairs in the data store. Once key-value pairs in column families 310 have been flushed to storage 128, the requests may be removed from the commit log 530.

Application 520 may also be configured to merge multiple SSTables 540 associated with a single column family 310 using a process called compaction. In the background, application 520 sorts each SSTable 540 and combines rows associated with the same key into a single row in a new SSTable 540, associating only the most recent entries for each column associated with a unique identifier for that row. Once a new combined SSTable 540 has been created, the old SSTables 540 may be deleted by application 520. In the aggregate, all SSTables 540 stored in the cluster reflect the data in the eventually-consistent data store at a previous point in time. Thus, each SStable 540 provides an inconsistent snapshot of the key-value pairs associated with a column family for a particular node at a given point in time.

Building a Point-In-Time Snapshot of the Data Store

A data analyst may have problems attempting to monitor the state of the data store at a particular point-in-time because of the distributed nature of the data store. On one hand, the data analyst could force a consistent scan across each node 131 in the data store, in effect, blocking any access to the data store while the consistent scan is taking place. However, such a technique may be disruptive to clients attempting to access information in the data store because the nodes will be inaccessible while data is replicated across all nodes and then transmitted to the analyst's computer. Instead, the present disclosure describes a method and system to generate a snapshot of the data store that provides a lagging consistency point based on the inconsistent SSTables 540 stored in the various nodes of cluster 400.

Figure 6:
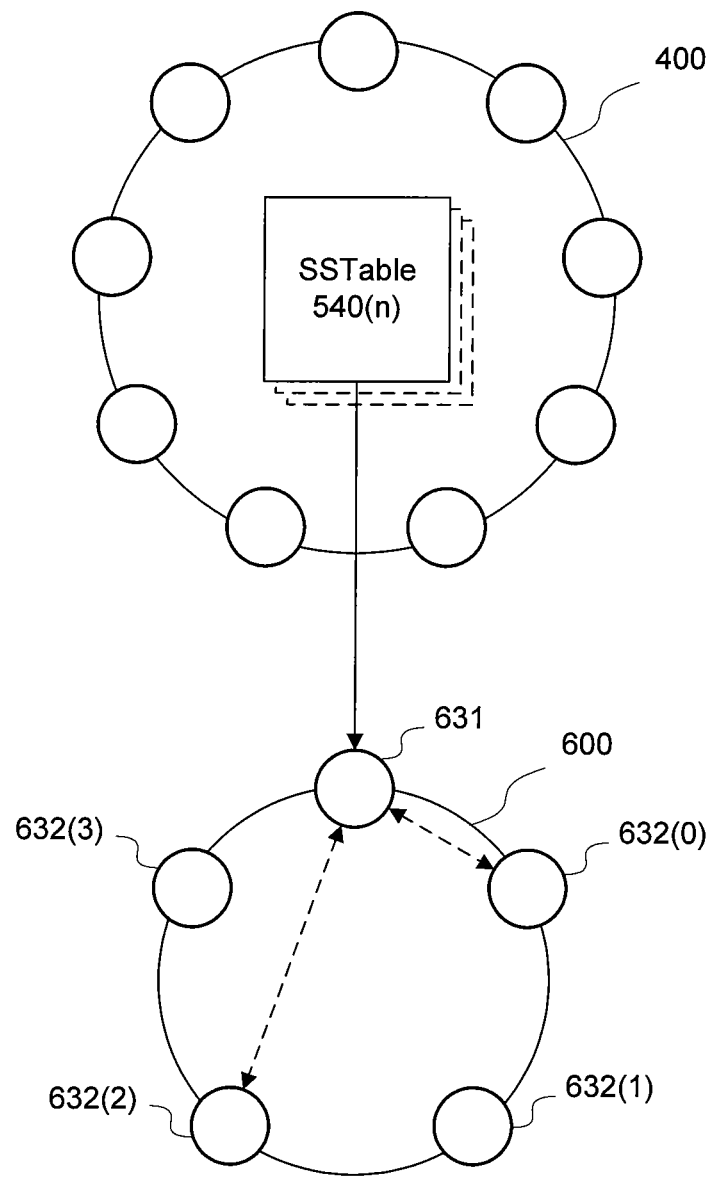
FIG. 6 illustrates a system for generating a point-in-time snapshot of an eventually-consistent data store, according to one example embodiment of the invention.

FIG. 6 illustrates a system for generating a point-in-time snapshot of an eventually-consistent data store, according to one example embodiment of the invention. As shown, the eventually-consistent data store may be implemented on cluster 400 as described above in connection with FIGS. 1-5. A plurality of inconsistent snapshots (i.e., SSTables 540) is stored on cluster 400. A second cluster 600 may be implemented in cloud 110 using different resources, physical or virtual, than cluster 400. The number of nodes in cluster 600 may be different than the number of nodes of cluster 400. In one embodiment, the nodes in cluster 600 may be similar to the nodes in cluster 400. For example, each of the nodes of cluster 600 also includes a processor, a memory, a NIC, and one or more non-volatile storage devices. However, while each of the nodes executes a similar operating system, the nodes may execute different applications that provide an application framework for a distributed compute environment. In one embodiment, the applications executing on the nodes of cluster 600 may implement the Apache™ Hadoop distributed compute environment framework. The Hadoop framework provides common utilities, a distributed file system, and a MapReduce framework for processing large data sets on a plurality of nodes.

In one embodiment, cluster 600 is configured with one master node 631 and a plurality of slave nodes 632 configured to process the SSTables 540 retrieved from data store. The master node 631 is configured to retrieve the SStables 540 generated by each node in cluster 400. The SStables 540 may correspond to different points-in-time and may be inconsistent from node to node. For example, two nodes may contain related SSTables 540 that store different values for the same key because a WRITE request was configured to only write a value to a single node. Also, an SSTable 540 from one node may be generated before a WRITE request is processed whereas a related SSTable 540 from another node may be generated after the WRITE request is processed, leading to an inconsistency in the values stored in the SSTables 540.

In one embodiment, cluster 400 is configured to back-up all of the SSTables 540 stored in storage devices 128 of each node to a separate long-term storage location. The long-term storage location may be, among other implementations, a drive array connected to a private network coupled to cluster 400 or a virtual storage service such as Amazon® S3. Application 520 may be configured to copy SSTables 540 stored in storage device 128 to a location in the long-term storage periodically. For example, every night at 3 am, the nodes of cluster 400 may copy the SSTables 540 in storage device 128 to a bucket in the Amazon® S3 cloud storage. Then, cluster 600 may be configured to read the copies of SSTables 540 from the back-up storage location instead of the individual nodes in cluster 400. By reading backup copies instead of the primary copies on cluster 400, the administrator may avoid causing disruptions to access of the data store.

As the master node 631 retrieves the SSTables 540 (from either cluster 400 or the back-up storage location), the master node 631 implements a distributed MapReduce operation to process the SSTables 540 and generate a point-in-time snapshot of the data store. The MapReduce operation splits data into smaller portions for processing and distributes the data to a plurality of processing nodes that perform the same operation on the data. The results from all of the slave nodes 632 are then combined to form the total output. In one embodiment, as the master node 631 receives each SSTable 540, the master node 631 splits the SSTable 540 into processing tasks. A processing task includes at least a portion of the rows 311 in one or more SSTables 540. For example, the master node 631 may split the SSTables 540 into 64 MB chunks for distribution to each of the slave nodes 632. The processing task is then assigned to one of the slave nodes 632 for processing.

FIGS. 7A, 7B, and 7C illustrate various intermediate data structures generated by cluster 600 to create a point-in-time snapshot of the data store, according to one example embodiment of the invention. Again, cluster 600 generates a point-in-time snapshot of data store based on a plurality of inconsistent snapshots (i.e., SSTables 540) generated by the various nodes of the distributed data store. More specifically, the master node 631 retrieves each of the SSTables 540 associated with a particular column family 310 and combines the SSTables 540 into a single aggregate table 700 that includes one or more rows 311 storing key-value pairs from that column family 310.

As shown in FIG. 7A, the table 700 includes 16 rows (e.g., 311(0)-311(15)) of data combined from one or more SSTables 540 generated by the various nodes 131 that implement the data store. For example, a first row 311(0) includes a key 312(0) ("Bob"), a first column 313(0) ("name": "Bobby12"), a timestamp 313-1(0) ("1325135486") corresponding to the entry in the first column 313(0), a second column 314(0) ("pass": "BBCali24"), and a timestamp 314-1(0) ("1325135486") corresponding to the entry in the second column 314(0). A second row 311(1) is associated with the same key 312 as the first row 311(0), but the second row 311(1) includes a different value in the second column 314(1) ("pass": "bigboy123") as well as a different timestamp 314-1(1). The second row 311(1) corresponds to data added to the data store that reflects an operation for changing a password associated with a user ("Bob") stored in the data store. Table 700 also includes a fourth row 311(3) that is a duplicate of the second row 311(1), which reflects that the data was written to data store on at least two different nodes 131 (e.g., in response to a quorum WRITE request).

It will be appreciated that the rows 311 in the table 700 may be duplicated (because replicas of the rows 311 are included in SSTables 540 from different nodes) or that multiple rows 311 in the table 700 may map different values to the same key 312 because new values for that key 312 were added to data store at different times to "replace" old values. The sixteen rows 311 of the table 700 are shown in random order, such as the result of a process by which a master node 631 adds each row from an SSTable 540 to the bottom of table 700. In such a case, once the master node 631 has added all data from the SSTables 540 to table 700, the master node 631 may perform a sort of the rows 311 based on the keys 312 associated with the rows 311 to generate a sorted table 710, as shown in FIG. 7B. In alternate embodiments, the master node 631 may insert each row 311 from an SSTable 540 into a sorted location within table 700, thus maintaining a sorted order as table 700 is generated. However, such techniques may not be as efficient as first generating an unordered table 700 and then performing a distributed sort on the resulting data to generate the sorted table 710. In yet other embodiments, the master node 631 may not sort table 700 at all, distributing portions of the table 700 to the slave nodes 632 for compaction. In such embodiments, master node 631 must perform a further compaction operation on the combined results received from each of the slave nodes 632 in order to ensure that there are no duplicate rows or inconsistent data in the final output.

Once the master node 631 has generated a sorted table 710, the master node 631 performs a MapReduce operation to split the data into smaller portions and distribute the data to the slave nodes 632 for processing. In one embodiment, master node 631 splits the sorted table 710 up into processing tasks along boundaries defined by the keys 312 associated with the rows 311 of the sorted table 710. For example, as shown in FIG. 7B, the master node 631 may split the sorted table 710 up into processing tasks along the boundary formed between the tenth row 311(9) and the eleventh row 311(10), ensuring that the key 312 associated with the last row (e.g., 311(9)) in a first processing task is not the same as a key 312 associated with the first row (e.g., 311(10)) in the next processing task. The master node 631 then distributes each of the processing tasks to the slave nodes 632 to perform the distributed MapReduce operation.

Each of the slave nodes 632 receives a sorted list of rows from table 710. For example, a first slave node 632(0) may receive a sorted list including rows 311(0) through 311(9) from sorted table 710. Rows 311(0) through 311(9) correspond to rows associated with the "Bob" and "Carrie" keys. Similarly, a third slave node 632(2) may receive a sorted list including rows 311(10) through 311(15) from sorted table 710. Rows 311(10) through 311(15) correspond to rows associated with the "Jim" and "Steve" keys. A slave node 632 will process the sorted list of rows to remove any duplicate rows and discard any columns that were "replaced" by entries associated with a more recent timestamp. For example, the first slave node 632(0) may compact a first processing task (i.e., all rows corresponding to keys 312 "Bob" and "Carrie") to generate a result that includes two rows, a first row selected from one of the third 311(2) through fifth 311(4) rows of table 710 and a second row selected from one of the ninth 311(8) through tenth 311(9) rows of table 710. Similarly, the third slave node 632(2) may compact a second processing task to generate a result that includes two additional rows, a first row selected from one of the eleventh 311(10) through thirteenth 311(12) rows of table 710 and a second row selected from one of the fourteenth 311(13) through sixteenth 311(15) rows of table 710. The resulting compacted lists of non-duplicate, consistent data is then transmitted back to the master node 631, which combines the output of the slave nodes to generate the point-in-time snapshot (i.e., table) 720, as shown in FIG. 7C.

In one embodiment, the master node 631 converts the point-in-time snapshot 720 to a JSON (JavaScript Object Notation) format, a text-based standard designed for human-readable data exchange. A JSON object is an unordered set of name/value pairs enclosed in braces ({ }) and separated by a colon (:). Multiple sets of name/value pairs in the JSON object may be separated by a comma. It will be appreciated that the point-in-time snapshot may be converted to other types of formats as well, both human-readable and machine-readable, encrypted or non-encrypted, as is known in the art.

Figure 8:
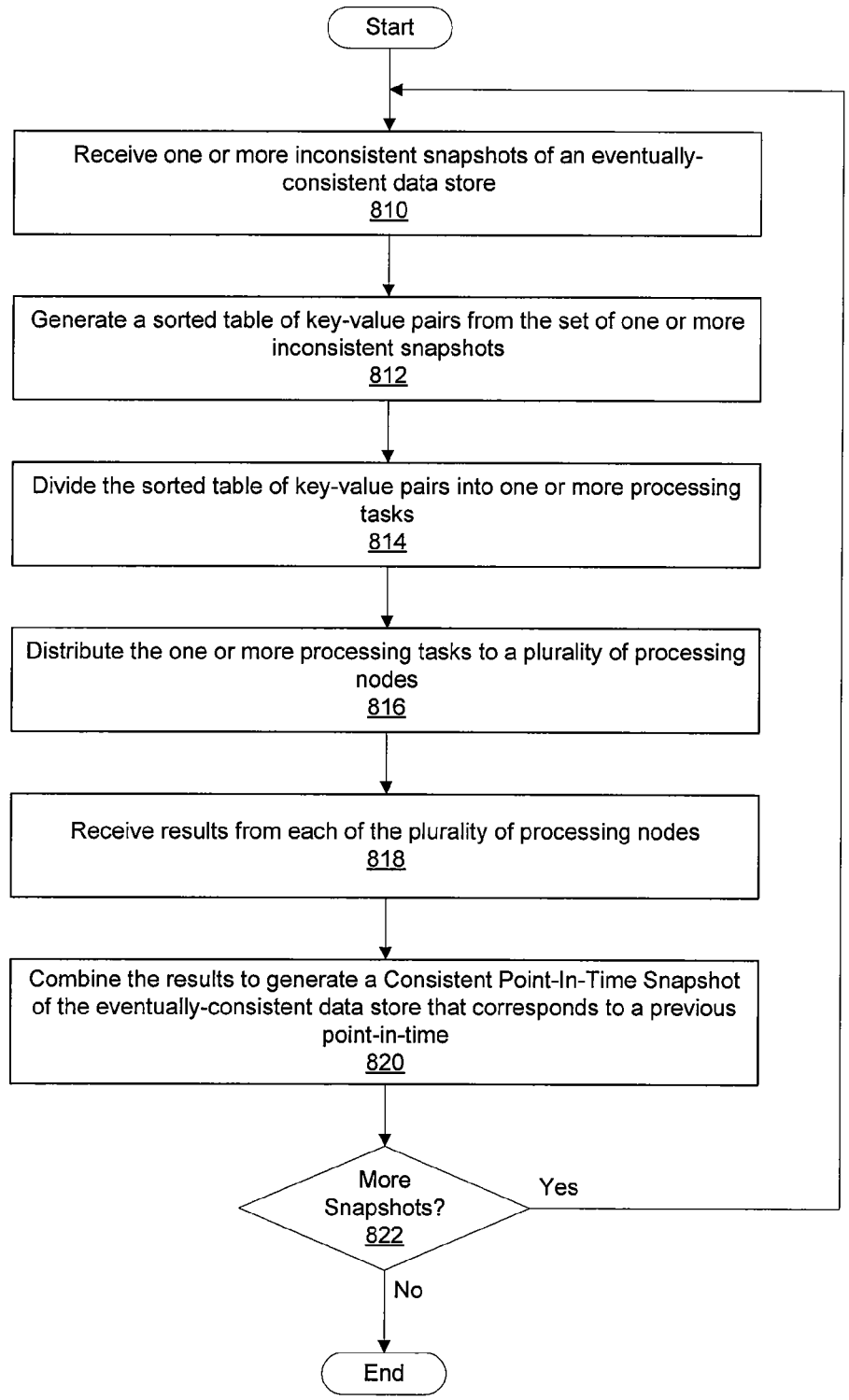
FIG. 8 illustrates a method for building a point-in-time snapshot of an eventually-consistent data store, according to one example embodiment of the invention.

FIG. 8 illustrates a method 800 for building a point-in-time snapshot 720 of an eventually-consistent data store, according to one example embodiment of the invention. Although the method steps are described in conjunction with the systems of FIGS. 1 through 7, persons skilled in the art will understand that any system configured to perform the method steps, in any order, is within the scope of the invention.

As shown, the method 800 begins at step 810 where a processing cluster 600 receives one or more inconsistent snapshots of an eventually-consistent data store. In one embodiment, the cluster 600 implements a distributed compute environment as a service on a set of virtual compute nodes 631, 632. A master node 631 in cluster 600 retrieves a set of SSTables 540 from a back-up data store coupled to the cluster 600. At step 812, the master node 631 generates a sorted table 710 of key-value pairs from the set of inconsistent snapshots. In one embodiment, the master node 631 first generates an unsorted list by combining rows 311 from each SSTable 540 associated with the data store into an aggregate table 700 and then sorts the unsorted, aggregate table 700 to generate a sorted table 710.

At step 814, the master node 631 divides the sorted table 710 of key-value pairs into one or more processing tasks. A processing task is a subset of rows from the sorted table 710. In one embodiment, the master node 631 divides the sorted table 710 along row boundaries to ensure that rows 311 associated with the same key 312 are directed to the same slave node 632 for processing. At step 816, the master node 631 transmits processing tasks to slave nodes 632 for processing. In one embodiment, the slave nodes 631 perform a compaction function on the rows of the processing tasks to generate an output table that includes a single row for each unique key 312. The slave node 632 selects the most recent columns (e.g., 313, 314, etc.) associated with each key 312 to include in the output table, eliminating any duplicate rows associated with the same key 312. At step 818, the master node 631 receives the results from the plurality of slave nodes 632. At step 820, the master node 631 combines the results received from the slave nodes 632 to generate a point-in-time snapshot of the eventually-consistent data store.

Due to the fact that the SSTables 540 produced by cluster 400 are immutable, once cluster 600 has created a point-in-time snapshot up to a certain point, the point-in-time snapshot may be updated by iterating through steps 810-820 and combining any additional SSTables 540 generated by cluster 400 since a previous point-in-time corresponding to the snapshot 720.

Figure 9:
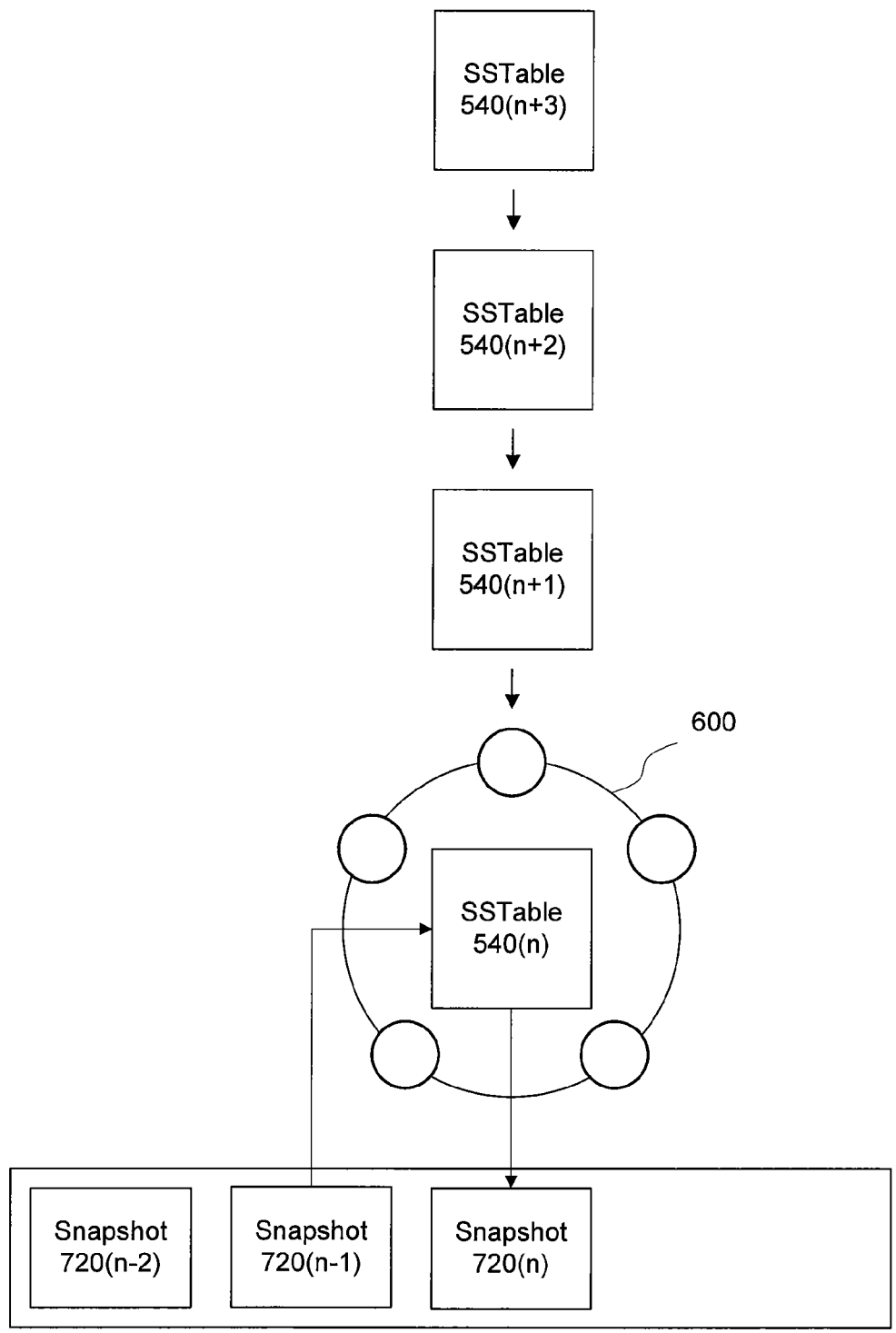
FIG. 9 illustrates a perpetual process for updating the point-in-time snapshot, according to one example embodiment of the invention.

FIG. 9 illustrates a perpetual process for updating the point-in-time snapshot 720, according to one example embodiment of the invention. As shown in FIG. 9, once cluster 600 has generated one point-in-time snapshot 720 ($n$-1) associated with a first point-in-time, the cluster 600 may generate a new point-in-time snapshot 720($n$) using the snapshot 720($n$-1) from the previous point-in-time as a starting point for generating sorted table 710. Rather than accumulating each and every SSTable 540 from cluster 400, the master node 631 only needs to retrieve any additional SSTables 540 that have been generated by cluster 400 since the previous point-in-time. The rows 311 from these new SSTables 540 are then added to the snapshot from the previous point-in-time 720($n$-1) to generate a new sorted list 710 that is compacted via the slave nodes 632 to generate the new point-in-time snapshot 720($n$) corresponding to a consistency point that is more recent than that of the previous point-in-time snapshot 720($n$-1).

Returning now to FIG. 8, method 800 continues at step 822, where the master node 631 determines whether to update the previous point-in-time snapshot 720. If the previous point-in-time snapshot should be updated, then master node 631 retrieves any SSTables 540 generated by cluster 400 since the previous point-in-time and repeats steps 810-820 to generate a new point-in-time snapshot 720 corresponding to a more recent consistency point. However, if the master node 631 determines that the snapshot 720 does not need to be updated at this time, then method 800 terminates.

The techniques described herein are implemented using a cloud-based virtual computing architecture. However, it will be appreciated that these techniques and systems may also be implemented by a single computer in a non-distributed manner. In such embodiments, steps 814-820 of method 800 may be replaced by a single step where the server computer performs the compaction operation on the sorted table 710. For example, a server computer may download each of the SSTables 540 from the cloud 110 and generate sorted table 710 locally in a memory or storage device attached to the server computer. Instead of splitting up the sorted table 710 and distributing smaller processing tasks to a plurality of compute nodes, the server computer could perform the equivalent of the MapReduce operation locally by compacting the sorted table 710 using a single processor. Although most eventually-consistent data stores 300 are very large so as to make such a technique inefficient, generating the point-in-time snapshot 720 with a single processor, rather than a distributed compute environment, is within the scope of the present invention.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for building a point-in-time snapshot of an eventually-consistent data store distributed among a plurality of nodes connected by a network, the method comprising:
   receiving a plurality of inconsistent snapshots, wherein each inconsistent snapshot includes one or more rows of key-value pairs associated with the data store and reflects contents of at least a portion of the data store stored on a particular node of the plurality of nodes; and
   generating the point-in-time snapshot by resolving the one or more rows of the key-value pairs to remove any inconsistent values, wherein the point-in-time snapshot includes a subset of the key-value pairs included in the plurality of inconsistent snapshots, wherein generating the point-in-time snapshot comprises:
      dividing the one or more rows of the key-value pairs from the plurality of inconsistent snapshots into one or more processing tasks, wherein each processing task includes a different portion of the key-value pairs;
      distributing each processing task to one of a plurality of processing nodes configured to perform a reduce operation;
      receiving a number of results from the plurality of processing nodes corresponding to a number of distributed processing tasks; and
      combining the number of results to generate the point-in-time snapshot.

2. The computer-implemented method of claim 1, wherein the one or more rows of the key-value pairs include a key value and one or more columns associated with the key value, each column being associated with a column identifier, a corresponding column value, and a timestamp value that represents a particular time at which the column was added to the data store.

3. The computer-implemented method of claim 2, wherein the reduce operation comprises performing a compaction operation configured to remove duplicate rows included in the one or more rows of the key-value pairs from the one or more processing tasks and generate a single row associated with each unique key value included in the one or more processing tasks, wherein the single row includes one or more columns associated with the unique key value, each column in the single row being associated with a unique column identifier for that single row selected from the column in a processing task included in the one or more processing tasks that is associated with the unique key value and the unique column identifier as well as the most recent timestamp value.

4. The computer-implemented method of claim 1, wherein the plurality of processing nodes is implemented via an application framework configured to provide at least one of a distributed file system and a framework for processing large data sets on the plurality of processing nodes.

5. The computer-implemented method of claim 1, wherein the data store is implemented via a database configured to automatically generate the inconsistent snapshots at periodic intervals, and wherein each inconsistent snapshot comprises a sorted string table (SSTable).

6. The computer-implemented method of claim 1, further comprising converting the point-in-time snapshot to a JavaScript Object Notation (JSON) format.

7. The computer-implemented method of claim 1, further comprising:
   receiving one or more additional inconsistent snapshots generated by the data store subsequent to generating the point-in-time snapshot; and
   generating an updated point-in-time snapshot by resolving the one or more rows of the key-value pairs in the one or more additional inconsistent snapshots as well as the point-in-time snapshot to remove any inconsistent values.

8. A system for building a point-in-time snapshot of an eventually-consistent data store, comprising:
   a plurality of slave processors connected by a network and storing the data store; and
   a master processor connected to the data store via the network, and, when executing a first software application stored in a memory, the master processor is configured to:
      receive a plurality of inconsistent snapshots, wherein each inconsistent snapshot includes one or more rows of key-value pairs associated with the data store and reflects contents of at least a portion of the data store stored on a first slave processor included in the plurality of slave processors, and
      generate the point-in-time snapshot by resolving the one or more rows of the key-value pairs to remove any inconsistent values, wherein the point-in-time snapshot includes a subset of the key-value pairs included in the plurality of inconsistent snapshots, wherein generating the point-in-time snapshot comprises:
         dividing the one or more rows of the key-value pairs from the plurality of inconsistent snapshots into one or more processing tasks, wherein each processing task includes a different portion of the key-value pairs;
         distributing each processing task to a slave processor included in the plurality of slave processors configured to perform a reduce operation;
         receiving a number of results from the plurality of slave processors corresponding to a number of distributed processing tasks; and
         combining the number of results to generate the point-in-time snapshot.

9. The system of claim 8, wherein the one or more rows of the key-value pairs include a key value and one or more columns associated with the key value, each column being associated with a column identifier, a corresponding column value, and a timestamp value that represents a particular time at which the column was added to the data store.

10. The system of claim 9, wherein the reduce operation comprises performing a compaction operation configured to remove duplicate rows included in the one or more rows of the key-value pairs from the one or more processing tasks and generate a single row associated with each unique key value included in the one or more processing tasks, wherein the single row includes one or more columns associated with the unique key value, each column in the single row being associated with a unique column identifier for that single row selected from the column in a processing task included in the one or more processing tasks that is associated with the unique key value and the unique column identifier as well as the most recent timestamp value.

11. The system of claim 8, wherein the plurality of slave processors is implemented via an application framework configured to provide at least one of a distributed file system and a framework for processing large data sets on the plurality of slave processors.

12. The system of claim 8, wherein the data store is implemented via a database configured to automatically generate the inconsistent snapshots at periodic intervals, and wherein each inconsistent snapshot comprises a sorted string table (SSTable).

13. The system of claim 8, wherein, when executing the first software application, the master processor is further configured to convert the point-in-time snapshot to a JavaScript Object Notation (JSON) format.

14. The system of claim 8, wherein, when executing the first software application, the master processor is further configured to:
  receive one or more additional inconsistent snapshots generated by the data store subsequent to generating the point-in-time snapshot;
  generate an updated sorted table that includes each of the one or more rows of the key-value pairs from the one or more additional inconsistent snapshots and the point-in-time snapshot; and
  generate an updated point-in-time snapshot by resolving the one or more rows of the key-value pairs in the updated sorted table to remove any inconsistent values.

15. A non-transitory computer-readable storage medium including instructions that, when executed by a processing unit, cause the processing unit to perform an operation for building a point-in-time snapshot of an eventually-consistent data store, the operation comprising:
  receiving a plurality of inconsistent snapshots, wherein each inconsistent snapshot includes one or more rows of key-value pairs associated with the data store and reflects contents of at least a portion of the data store stored on a particular node of the plurality of nodes;
  generating a sorted table including each row of key-value pairs from the plurality of inconsistent snapshots; and
  generating the point-in-time snapshot by resolving the one or more rows of the key-value pairs in the sorted table to remove any inconsistent values, wherein the point-in-time snapshot includes a subset of the rows of key-value pairs included in the sorted table such that each unique key is associated with a single row that is selected from all rows in the sorted table associated with that particular key, wherein generating the point-in-time snapshot comprises:
    dividing the sorted table into one or more processing tasks, wherein each processing task includes a different portion of the one or more rows of the key-value pairs within the sorted table;
    distributing each processing task to one of a plurality of processing nodes configured to perform a map operation;
    receiving a number of results from the plurality of processing nodes corresponding to a number of distributed processing tasks; and
    performing a reduce operation on the number of results to generate the point-in-time snapshot.

16. The computer-readable storage medium of claim 15, wherein the one or more rows of the key-value pairs include a key value and one or more columns associated with the key value, each column being associated with a column identifier, a corresponding column value, and a timestamp value that represents a particular time at which the column was added to the data store.

17. The computer-readable storage medium of claim 16, wherein the reduce operation comprises performing a compaction operation configured to remove duplicate rows included in the one or more rows of the key-value pairs from the one or more processing tasks and generate a single row associated with each unique key value included in the one or more processing tasks, wherein the single row includes one or more columns associated with the unique key value, each column in the single row being associated with a unique column identifier for that single row selected from the column in a processing task included in the one or more processing tasks that is associated with the unique key value and the unique column identifier as well as the most recent timestamp value.

* * * * *